United States Patent
Belger et al.

(10) Patent No.: US 6,219,968 B1
(45) Date of Patent: Apr. 24, 2001

(54) GROWING BODY FOR PLANTS ESPECIALLY FOR PLANT SEEDLINGS

(75) Inventors: Christian Belger, Moers; Jörg Wassenberg, Düsseldorf, both of (DE)

(73) Assignee: Pro Flora GmbH, Duisburg (DE)

( * ) Notice: Subject to any disclaimer, the term of this patent is extended or adjusted under 35 U.S.C. 154(b) by 0 days.

(21) Appl. No.: 09/308,426

(22) PCT Filed: Sep. 19, 1998

(86) PCT No.: PCT/DE98/02785

§ 371 Date: May 19, 1999

§ 102(e) Date: May 19, 1999

(87) PCT Pub. No.: WO99/13702

PCT Pub. Date: Mar. 25, 1999

(30) Foreign Application Priority Data

Sep. 19, 1997 (DE) .............................. 197 41 293

(51) Int. Cl.[7] .................................. A01G 1/00
(52) U.S. Cl. ........................ 47/74; 47/64; 47/73
(58) Field of Search ................ 47/73, 74, 77, 47/9, 63, 64

(56) References Cited

U.S. PATENT DOCUMENTS

| 3,375,607 | * | 4/1968 | Melvold . | |
|---|---|---|---|---|
| 3,513,594 | * | 5/1970 | Hasselbach . | |
| 3,608,238 | * | 9/1971 | Reuter . | |
| 3,656,930 | * | 4/1972 | Martin . | |
| 3,842,537 | | 10/1974 | Bishop . | |
| 3,961,445 | * | 6/1976 | Rack . | |
| 3,962,823 | * | 6/1976 | Zipperer, III . | |
| 4,528,774 | * | 7/1985 | Skaife . | |
| 4,782,626 | * | 11/1988 | Shanley et al. | 47/9 X |
| 5,191,734 | * | 3/1993 | Weber et al. | 47/9 X |
| 5,218,783 | * | 6/1993 | Langezaal et al. | 47/64 |
| 5,224,292 | * | 7/1993 | Anton | 47/64 |
| 5,456,733 | * | 10/1995 | Hamilton, Jr. | 47/9 X |
| 5,458,662 | * | 10/1995 | Toyone | 47/9 X |
| 5,756,024 | * | 5/1998 | Huang . | |
| 5,836,107 | * | 11/1998 | Behrens | 47/56 |

FOREIGN PATENT DOCUMENTS

| 2 137 609A | | 10/1984 | (DE) . |
| 0 620 965 A1 | * | 10/1994 | (EP) . |
| 2252553 | * | 8/1992 | (GB) . |
| 8260467 | * | 10/1996 | (JP) . |
| 9168329 | * | 6/1997 | (JP) . |
| 1005417 C6 | * | 9/1998 | (NL) . |
| WO 94/12576 | * | 6/1994 | (WO) . |

* cited by examiner

Primary Examiner—Peter M. Poon
Assistant Examiner—Jeffrey L. Gellner
(74) Attorney, Agent, or Firm—Cohen, Pontani, Lieberman & Pavane

(57) ABSTRACT

A solid body for growing plants, especially plant seedlings, which can be used for plants of any desired size, has a compact structure, and is highly advantageous with respect to storage and handling the solid body is made of coco peat having an insertion area for plants on its top side.

7 Claims, 1 Drawing Sheet

GROWING BODY FOR PLANTS ESPECIALLY FOR PLANT SEEDLINGS

BACKGROUND OF THE INVENTION

1. Field of the Invention

The invention relates to a solid body for growing plants, especially plant seedlings.

2. Discussion of the Prior Art

A solid body in the form of a planting and cultivating container used, in particular, for cultivating and raising plants is known (DE 195 16 572 C2). The container comprises a bottom wall part and a side wall part embodied in a single piece therewith. The wall parts are made of coconut fibers bound into a coconut fabric by means of latex. Plants are placed into the container together with earth. When large numbers of plants are involved, this container, by its nature, requires a relatively large area and is also relatively expensive. Moreover, planting the plants entails more work, because humus or earth mixtures must first be put into the container. Further, because the planting and cultivating container must possess a certain strength, at least its side wall parts are reinforced with one or more integrated stiffening ribs formed by material compression. Such containers are very expensive when high piece numbers are involved. On the other hand, containers produced from coco fibers and latex can decompose biologically, so that the disadvantages associated with plastic containers, metal containers and the like do not occur.

When containers of the above type cannot be used because the space required by the seedlings is not available, the problem is posed of how to nonetheless benefit from the biological decomposability of containers made from coco fibers and latex. Another problem is raised by the materials to be placed in the container, such as earth, humus or growth-promoting fertilizers.

SUMMARY OF THE INVENTION

The object of the invention is to endow the solid body for growing plants with a more compact structure and to simplify its use when planting plants.

According to the invention, this object is attained with the aforementioned basic solid body for growing plants, especially plant seedlings, by using a solid body of coco peat that has an insertion area for plants on the top. When coconuts are processed, the coco fibers and the coco peat are separated from each other in a known manner in special coconut mills. Advantageously, the invention permits coco peat to be used in a still-processible state and in place of natural peat, which, in the near future, will no longer be available in sufficient quantities. In addition, the coco peat is biologically decomposable, serves to replace the earth or humus, and does not need to be placed into a container. The solid growing body is not only manually simpler to use, but also requires less space. Nor are there any strength problems during transport and handling. In addition, the solid growing bodies, which can have an uncompressed insertion area for plants, can be manufactured in all sizes. Thus, such solid growing bodies can also be used for tree seedlings and the like.

The planting of plants, seedlings, cuttings and seed corn is aided by the fact that the insertion area comprises one or more holes or a depression, or the like.

In further embodiment of the invention, the solid body of coco peat is geometrically shaped, and its outer shape is fixed by compression. Almost any technically and economically producible shape that is advantageous for ergonomic manual handling during planting in a cultivating area can be used.

According to further embodiment of the invention, the solid growing body is made of 100% compressed coco peat with a compression ratio of between 2:1 and 10:1. The compression ratio takes into account the various geometrical shapes as well as the different plant sizes and types.

Advantageously, the degree of compression of the compressed solid body of coco peat can be selected as a function of the size (the dimensions) of the solid growing body, whereby the lowest degree of compression is associated with the largest solid growing body.

Further, in an essential embodiment, the compressed solid is coated with latex, except for the insertion area. As a result, the shape created by compression can be maintained and, during lengthy storage, the coco peat is protected in the interior from external influences. In addition, handling and storage are simpler. Thus, even the smallest growing bodies cannot stick together, and all retain their compressed shape.

According to other features, the latex can be neutralized. A two-stage process is thereby used during coating. A first step calls for the immersion of the solid growing body into a first acidic latex mixture, while a second step calls for immersion into a second, neutralizing mixture of latex, which contains carbon-containing additives (Sri Lanka Patent 10303 of Apr. 10, 1992).

In a design that is especially advantageous with respect to handling the solid growing body and placing it into free cultivation (area of earth), the solid growing body is shaped and compressed into a (cylindrical) round disk of predeterminable thickness (height) and predeterminable diameter.

The creation of a compact solid body with controllable thickness allows other substances that are important for plant development to be added as simply as possible. It is thus advantageous that, with less than 100% coco peat, mineral substances are mixed with the solid growing body.

Other substances can also be added to the solid growing body in this way. In another example, with less than 100% coco peat, artificial fertilizer is mixed with the solid growing body.

Such substances can be added before or after compression of the solid growing body. It has proved particularly advantageous for the coco peat to be processed into a solid while in a relatively moist state.

Optimal conditions for the process of compressing the solid growing body are attained when the moisture content of the coco peat is 10% to 16%.

BRIEF DESCRIPTION OF THE DRAWINGS

An example of the invention is shown in the drawings and described in detail below. The drawings show.

DETAILED DESCRIPTION OF THE PREFERRED EMBODIMENTS

Figure 1:
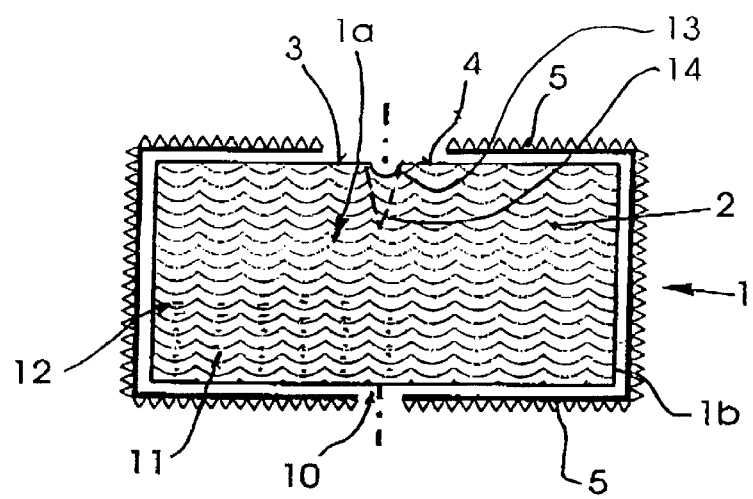
FIG. 1 is a vertical cross-section (A—A as in FIG. 2) through a cylindrical solid growing body; persuant to the present invention

The solid growing body 1 consists of coco peat 2 (FIG. 1) and initially has an insertion area 4 on the top side 3 for the introduction of a plant, seedling or seed corn. The insertion area comprises either a flat surface, or one or more holes 13, or a small depression 14, so that plants can be inserted by their roots into the interior 1a of the solid growing body 1 by the usual hand movement of a skilled person. Of course, such a depression 14 can also be formed in the provided insertion area 4 by means of an appropriate tool. The solid growing body 1 has been created in a mold, a pressing die or the like, and its outer shape 1b is fixed by compression. The compression ratio of the loose coco peat to the finished solid growing body 1 is between 2:1 and 10:1. The degree of compression of the compressed solid growing body 1 of coco peat 2 is selected depending on the plant, seedling or seed corn, whereby the lowest degree of compression of the solid growing body 1 is associated with the largest dimensions. The compressed solid growing body 1 is coated with latex 5. However, the insertion area 4 is left uncoated, so as not to hinder the planting of the plants. The uncoated insertion area 4 also serves for the addition of water, in the event that the plant is to be watered immediately after planting. The outermost surface of the latex 5 is neutralized.

Figure 2:
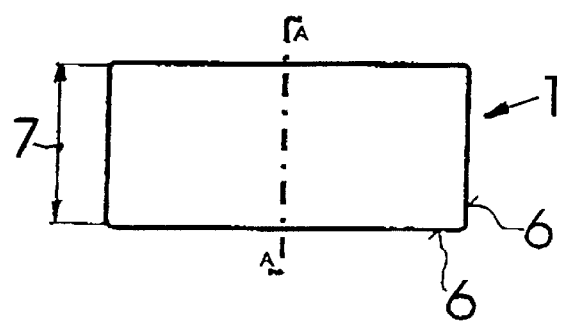
FIG. 2 is a side view of the solid growing body.
Figure 4:
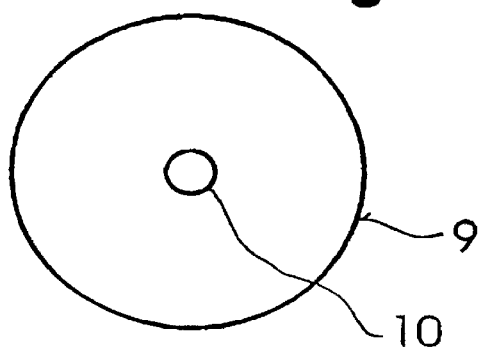
FIG. 4 is a bottom view of the solid growing body.
Figure 3:
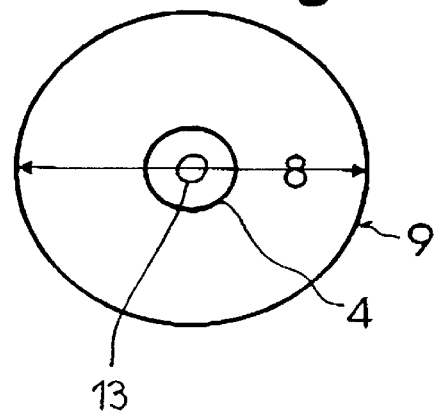
FIG. 3 is a top view of the solid growing body as in FIGS. 1 and 2.

The solid growing body 1 (FIG. 2) is shaped into a round disk 6, which has a predeterminable thickness 7 and a predeterminable diameter 8 (FIG. 3) in keeping with the plant to be planted, so that a cylinder 9 is created. FIG. 3 also shows the insertion area 4. Seen from below (FIG. 4), a free surface 10, which is kept somewhat smaller than the insertion area 4, is created to assist water penetration from below. Water penetration from above is also possible at this point, in the event of water oversupply.

Further, minerals 11, artificial fertilizer 12 or similar substances can be added to the solid growing body 1. These substances can be easily added to and dissolved in coco peat that is still in a somewhat moist state. The process of compressing the coco peat 2 is advantageously carried out at a moisture content of 10% to 16%. While the moisture content must be adhered to very precisely, it is not essential to take into account deviations from the normal temperature.

What is claimed is:

1. A solid body for growing plants, comprising: a solid block of coco peat having a top side with an insertion area for plants, the insertion area having at least one hole and at least one depression, the solid block of coco peat being geometrically shaped and having an outer shape fixed by compression: and a latex coating on the solid block, except for the insertion area.

2. A solid growing body as defined in claim 1, wherein the solid block is made of 100% compressed coco peat with a compression ratio of between 2:1 and 10:1.

3. A solid growing body as defined in claim 2, wherein the degree of compression of the compressed solid block of coco peat depends on a size of the solid growing body, a lowest degree of compression for the solid growing body being associated with largest dimensions.

4. A solid growing body as defined in claim 1, and further comprising an additional latex layer provided so as to neutralize the latex coating.

5. A solid growing body as defined in claim 1, wherein the solid block is shaped and compressed into a round disk of predeterminable thickness and predeterminable diameter.

6. A solid growing body as defined in claim 1, and further comprising minerals mixed with the coco peat of the solid block.

7. A solid growing body as defined in claim 1, and further comprising artificial fertilizer mixed with the coco peat of the solid block.

* * * * *